United States Patent [19]

Pluviose

[11] Patent Number: 4,735,224
[45] Date of Patent: Apr. 5, 1988

[54] METHOD FOR STABILIZING THE FLOW OF FLUIDS AT THE TIME OF EXPANSION ACCOMPANIED BY KINETIC ENERGY DEGRADATION, A VALVE AND A PRESSURE REDUCER FOR CARRYING OUT SAID METHOD

[75] Inventor: Michel Pluviose, Bondy, France

[73] Assignee: Centre Technique des Industries Mecaniques, France

[21] Appl. No.: 895,197

[22] Filed: Aug. 11, 1986

Related U.S. Application Data

[62] Division of Ser. No. 705,093, Feb. 25, 1985, Pat. No. 4,688,755.

[51] Int. Cl.$^4$ .................... F16K 47/04; F16K 47/08
[52] U.S. Cl. ........................................ 137/1; 138/44; 251/118; 251/121; 181/268
[58] Field of Search ............... 138/44, 45; 181/264, 181/268; 251/118, 121, 122; 137/1

[56] References Cited

U.S. PATENT DOCUMENTS

| | | | |
|---|---|---|---|
| 3,105,570 | 10/1963 | Bezemes | 138/44 X |
| 3,750,710 | 8/1973 | Hayner | 138/44 X |
| 3,857,542 | 12/1974 | Heymann | 251/120 |
| 4,402,485 | 9/1983 | Fagerlund | 138/44 X |
| 4,506,860 | 3/1985 | Schwerdtner et al. | 251/118 X |

FOREIGN PATENT DOCUMENTS

| | | | |
|---|---|---|---|
| 2334576 | 1/1975 | Fed. Rep. of Germany | 251/118 |
| 481377 | 5/1953 | France | 181/268 |

Primary Examiner—Arnold Rosenthal
Attorney, Agent, or Firm—George H. Gerstman

[57] ABSTRACT

At the time of expansion and accompanying kinetic degradation of a flowing stream of fluid, the flow is stabilized by forming at least two contiguous flow streams which consist of the same fluid but have a different velocity distribution and the two streams are then mixed. When applying the method to a valve provided with a so-called "hemispherical" closure member for compressible fluids, subsonic discharge nozzles are formed by cutting recesses in the valve seat downstream of the zone in which the valve closure member bears on the valve seat in the closed position. The subsonic discharge nozzles are disposed in alternate sequence with supersonic discharge nozzles formed by the opposite surfaces of the valve closure member and of the valve seat outside the recesses. When the method is applied to a multi-bore pressure reducer for compressible gases, a pressure-reducing plate is provided with low-discharge ducts in adjacent relation to high-discharge ducts.

11 Claims, 3 Drawing Sheets

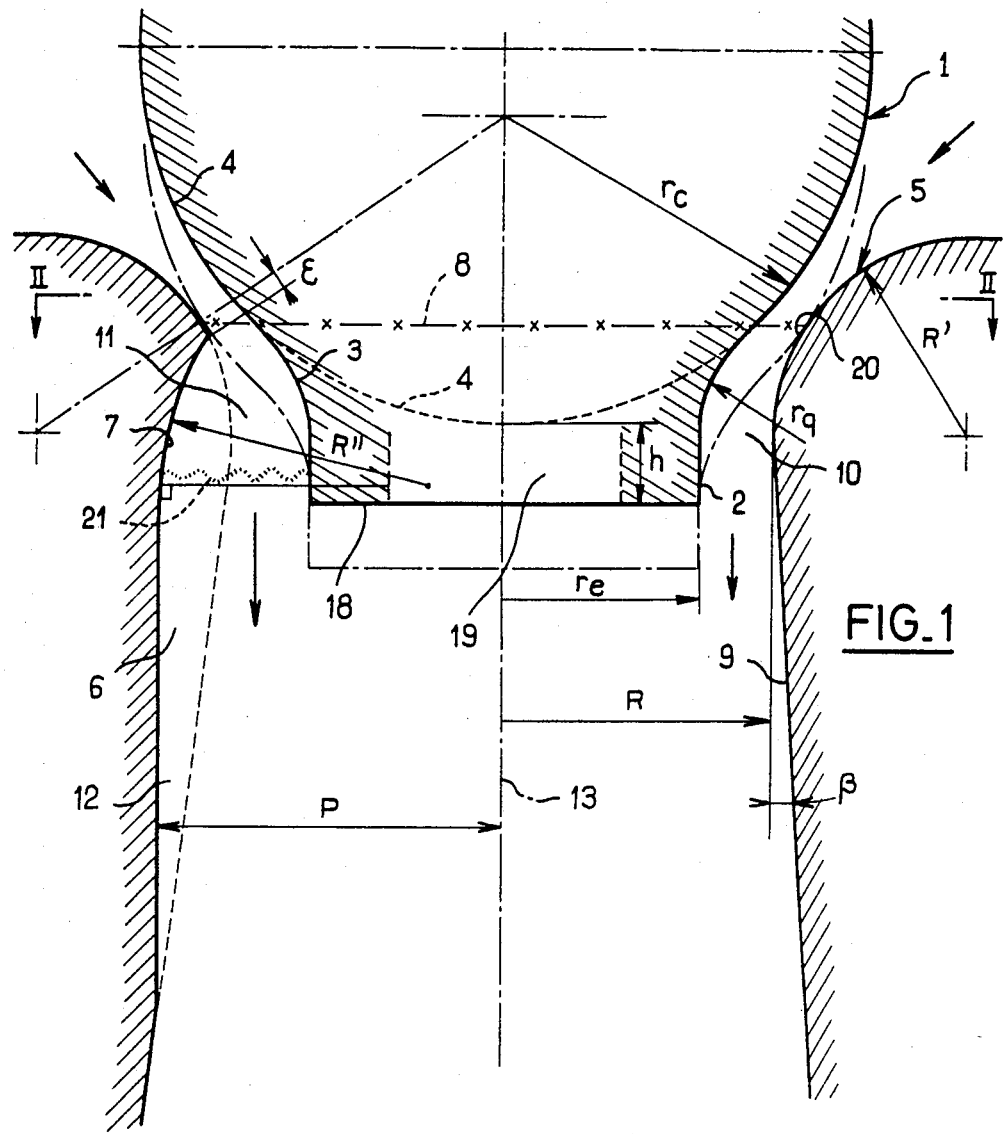
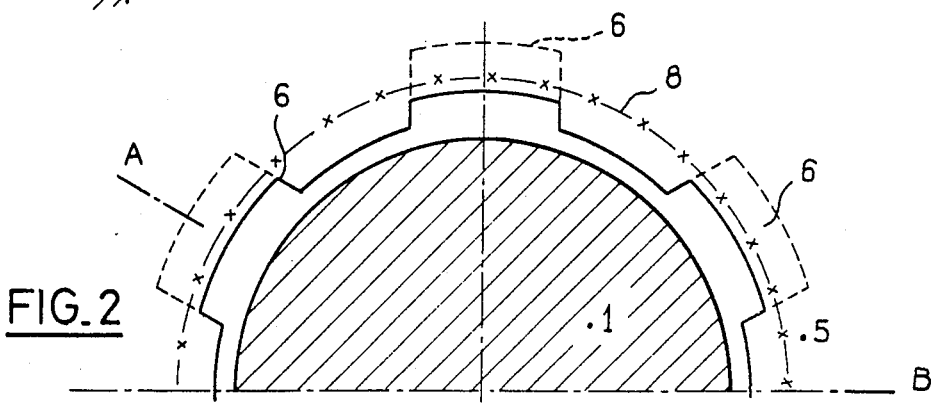

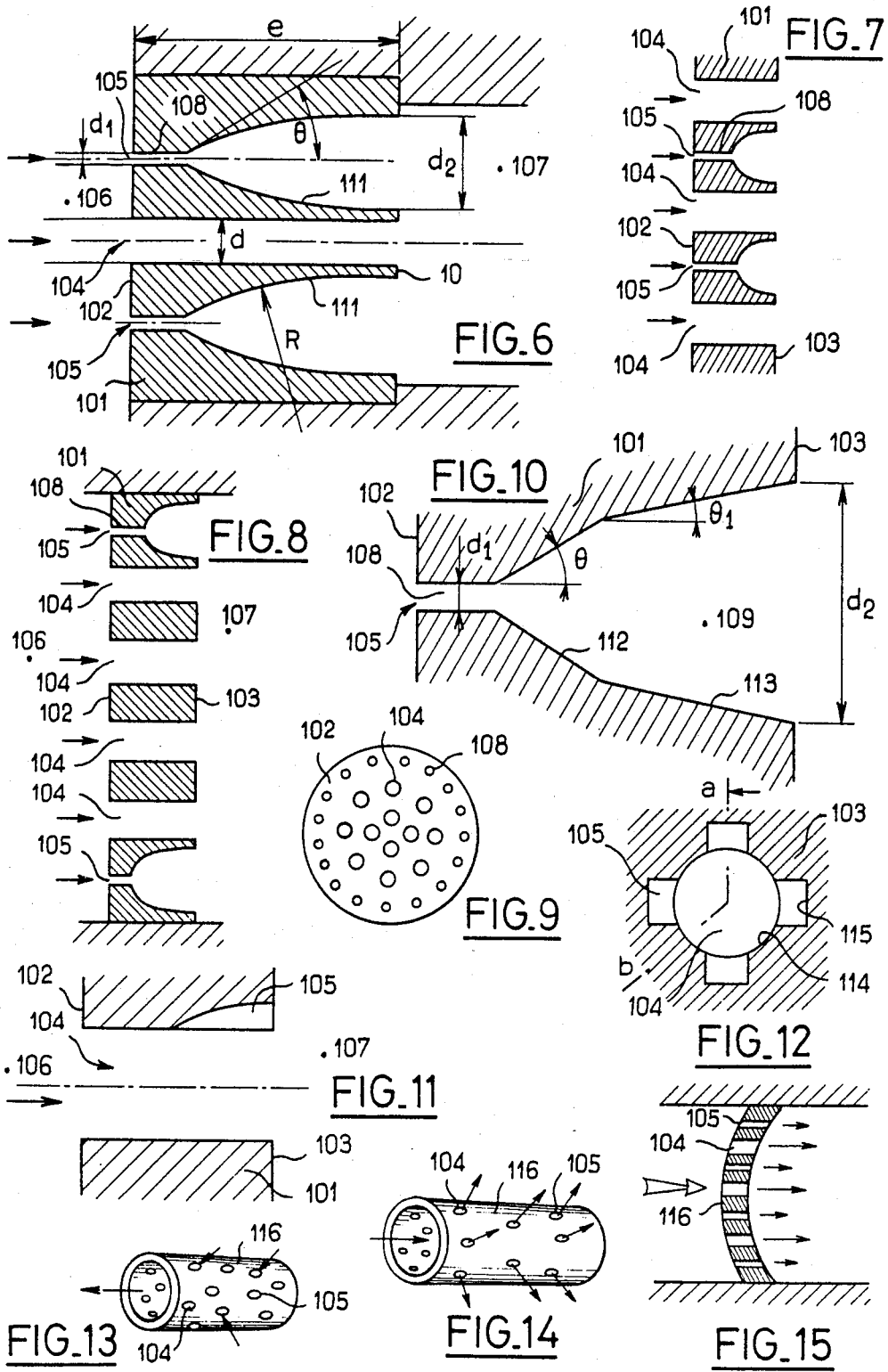

METHOD FOR STABILIZING THE FLOW OF FLUIDS AT THE TIME OF EXPANSION ACCOMPANIED BY KINETIC ENERGY DEGRADATION, A VALVE AND A PRESSURE REDUCER FOR CARRYING OUT SAID METHOD

This is a division of application Ser. No. 705,093, filed Feb. 25, 1985 now U.S. Pat. No. 4,688,755 dated Aug. 25, 1987.

BACKGROUND OF THE INVENTION

1. Field of the Invention

The present invention relates to improvements in unsteady-state fluid flow regimes and to their industrial applications.

2. Description of the Prior Art

In industrial installations for conveying compressible fluids, it is a common practice to carry out fluid expansions through orifices located between enclosures at different pressures without recovery of kinetic energy.

This is the case in particular with expansion valves and multi-bore pressure reducers or screen tubes such as those employed in steam power plants.

The mass flow rate as well as the upstream and downstream pressure levels are mostly imposed and the pressure ratio is often sufficiently high to permit the establishment of supersonic flow regimes.

The general principle of devices of this type lies firstly in acceleration of the fluid flow to full velocity followed by degradation of said velocity as a result of viscous friction forces and shock waves in a constant evolutionary process of stagnation enthalpy.

In a flow discharge from an orifice into the surrounding atmosphere or into a large enclosure, the flow pattern at the outlet of the orifice is different according to the expansion ratio. Nevertheless, the conditions of pressure on each side of the orifice are usually such that the flow in a first estimation is sonic in the outlet plane of the orifice.

As a result of viscous mixing with the surrounding fluid, the jet will deteriorate after a distance which will be variable according to the expansion ratio, this distance being usually greater than ten times the diameter of the orifice.

In the case of a two-dimensional flow discharge from an orifice into a downstream cavity, the supersonic jet comes into adhesive contact with either one wall or the other in a somewhat abrupt manner but without producing an unsteady state.

A viscous entrainment phenomenon in fact causes slowing-down of the jet and acceleration of the peripheral fluid layers. The entrained mass is renewed by fluid delivered at the downstream end. Since there is a state of independence between the mixture layers, the smallest disturbance destabilizes the system.

When the downstream pressure is reduced, the jet diverges to such an extent that the cavity which has remained in communication with the downstream end can no longer be supplied with mixture fluid, whereupon longitudinal and transverse oscillations of the fluid stream are observed. If a further pressure drop takes place from this position onwards, the flow stream is restored to a steady state and becomes symmetrical. Under conditions of flow within a cavity, similar observations are made but are more complex and difficult to analyze since the jet flows in rotational or swirling motion within the cavity.

Flow discharge from a plurality of orifices in parallel into a large enclosure or vessel is utilized systematically in the industrial field. This method is justified by the resultant increase in friction surfaces on the downstream side of the orifices inasmuch as loss by abrupt throttling and fluid-wiredrawing within the orifice is usually minor in comparison with the residual velocity loss.

Expansion is arrested as soon as the jet flow lines meet each other and the general effect thus produced is the same as if the flow had emerged from a single orifice, thus expanding to the pressure at which the above-mentioned jet flow lines meet, with the result that the friction surface area is abruptly reduced. It should be added that abrupt increases in length of the jet also occur in this case.

It may thus be stated that, up to the present time, the known techniques do not make it possible to ensure satisfactory mixing between the jets and the surrounding fluid and also fail to ensure steady-state stability of the fluid stream.

Return flows along the walls are therefore not capable of supplying mixture fluid to supersonic jets which accordingly undergo degradation only through oblique or straight shock-wave systems which are more or less stable at the time of initiation of the stream flow.

It is illusory to expect that jets can be mixed at similar flow velocities.

Finally, unstable flow regimes produce strong vibrations which cause degradation of structures and especially valves or pressure reducers.

SUMMARY OF THE INVENTION

The object of the present invention is to overcome the above-mentioned disadvantages of known devices which have been employed up to the present time for controlling the flow of fluid streams.

The invention is accordingly directed to a method for stabilizing the flow of fluids at the time of expansion, wherein said method comprises the formation of two contiguous flow streams consisting of the same fluid but having a different velocity distribution and mixing of the two flow streams with degradation of kinetic energy.

In the case of flow of compressible fluids in the supersonic regime, one flow stream is maintained unchanged in the supersonic regime and another flow stream is modified by conversion to the subsonic regime.

In an alternative embodiment of the method in accordance with the invention, a stream of fluid under pressure is split-up into a plurality of secondary streams which are modified in part, the modified and unchanged secondary streams being allowed to mix in a medium having a mean isentropic dynamic pressure (stagnation pressure) which is lower than that of the primary stream.

If the fluid discharge is caused to take place in the vicinity of a wall, it is usually preferable to isolate the wall from the highest-velocity stream by means of at least one lower-velocity stream which flows in a direction parallel to the wall.

The method in accordance with the invention is also applicable to discharges of fluids at a distance from side walls and front walls.

By way of alternative, the fluid discharge is guided between two walls so shaped as to form between them a series of nozzles having different flow characteristics. In this case, the shaped fluid-discharge walls can have opposite surfaces which are either parallel or divergent in the downstream direction, which can be flat, cylindrical or frusto-conical, or which are frusto-conical and flared-out in the downstream direction.

The invention is also directed to valves for compressible fluids with internal supersonic expansion which are employed for the practical application of the method in accordance with the invention.

A valve of this type comprises a smooth-walled "hemispherical" axial closure member provided with a cylindrical or frusto-conical downstream axial extension joined by means of a progressively curved wall to the "hemispherical" portion of the closure member. The valve seat having the general shape of a convergent-divergent nozzle is hollowed-out so as to form a plurality of relatively-spaced longitudinal recesses in the internal periphery of the valve seat. Each longitudinal recess is so designed as to slope abruptly from its upstream starting-point to the portion of greatest depth located downstream of the annular zone of contact of the spherical portion of the closure member with a semi-toric portion of the valve seat in the closed position of the valve and to decrease progressively in depth until it merges farther downstream with the divergent wall of said valve seat. In the positions of incomplete valve closure, the opposite surfaces of valve and valve seat form supersonic nozzles outside the recesses and subsonic nozzles with said recesses.

In a valve of this type, the wall of the closure member can form with the opposite wall of each recess cut in the valve seat a convergent-divergent nozzle which provides a low-expansion zone, the convergent portion of said nozzle being located upstream of the stafting-point of the recess whilst the divergent portion of said nozzle extends over at least part of the length of said recess.

The bottom wall of each longitudinal recess can either be parallel to or divergent from the valve axis in the recess portion of progressively decreasing depth.

In one embodiment, each recess has the shape of a groove having a rectangular right section and the bottom wall of each recess can form a dihedron having an angle of at least 90°, the edge of the dihedron being perpendicular to the axis of the valve-seat nozzle and the upstream wall of said dihedron being smaller in length than the downstream wall thereof.

All the recesses can be identical and uniformly spaced at the periphery of the valve seat or at least a certain number of recesses can be different.

It is usually an advantage to ensure that the upstream edge of each recess is rounded and to make provision for an even number of recesses located in spaced relation at distances which are equal to the width of said recesses.

Better results are usually achieved when the end face of the axial extension of the valve closure member is perpendicular to the axis and provided with a central cavity.

For a practical form of construction of a valve in accordance with the invention, good results are obtained when the ratio rc/R between the radius rc of the hemispherical portion of the valve closure member and the radius R at the throat of the nozzle formed by the valve seat is within the range of 1.1 to 1.6, when a value between 0.6 and 0.97 is adopted for the ratio re/R (where re is the radius of the axial cylindrical extension of the valve closure member), when a value between 0 and 0.4 is adopted for the ratio h/R (where h is the height of the extension of the valve closure member), the radius rq of the junction surface between the cylindrical extension and the hemispherical portion of the valve closure member being equal to 0.6 R.

Better results are again obtained when the ratio R'/R between the radius R' of the semi-toric surface of the valve seat and the radius R at the throat of the nozzle formed by the valve seat is within the range of 0.1 to 1, when the angle of divergence $\beta$ of the valve-seat nozzle is within the range of 3° to 4°, when the ratio P/R (P being the maximum depth from the valve axis, of the recesses cut in the valve seat) is equal to $(2-re/R)k$, where re is the radius of the axial valve extension and k is a coefficient comprised between 0.7 and 1.3, when the ratio R''/R (R'' being the radius of the upstream curve of the bottom wall of the recess at the point of junction with the semi-toric surface of the valve seat) is within the range of 0.75 to 1.25, the number of recesses being at least equal to 3.1416 P/P−re, where re is the radius of the axial cylindrical extension of the valve closure member.

The invention is also concerned with a multi-bore pressure reducer for compressible gases which is intended to carry out the method in accordance with the invention and is constituted by a perforated plate through which a plurality of ducts extend right through said plate from one principal face to the other and provide a connection with expansion but without kinetic energy recovery between two separate enclosures at different pressures, each enclosure being located respectively on each side of the principal faces of said plate. The distinctive feature of the pressure reducer lies in the fact that the perforated plate has ducts for different flow regimes so distributed as to ensure that a relatively low-discharge duct is located next to at least one relatively high-discharge duct.

In a particularly simple embodiment, all the ducts are cylindrical but the low-discharge ducts are ten times smaller in diameter than the high-discharge ducts.

In a further embodiment of the invention, the high-discharge ducts are constituted by cylindrical bores whilst the low-discharge ducts are each provided with a cylindrical entrance bore having a downstream extension in the form of an abruptly-flared portion.

Each low-discharge duct can advantageously form a divergent nozzle having a low-expansion zone. Each nozzle is defined in accordance with accepted practice in order to ensure that at least one recompression shock wave appears in the downstream portion of the nozzle and in a subsonic discharge regime.

In practice, it is often an advantage to provide the divergent portion of the nozzle with a longitudinal cross-section of bullet-nosed shape. The abruptly-flared portion can be frusto-conical and formed by at least two successive cone frustums, the angle at the apex of the downstream cone frustum being smaller than the angle at the apex of the cone frustum which precedes this latter in the upstream direction.

In accordance with an alternative embodiment, associated high-discharge and low-discharge ducts can be provided with a cylindrical entrance bore which is common to a central cylindrical high-discharge duct having the same diameter and to at least one lateral low-discharge duct formed by a longitudinal groove cut in the downstream wall of the central duct.

Each bore can have a plurality of parallel grooves which are advantageously spaced at uniform circumferential intervals.

In one practical embodiment, the pressure reducer comprises at least one high-discharge cylindrical duct having a diameter d and adjacent to a low-discharge duct provided with a cylindrical inlet having a diameter $d_1$ which is smaller than d and abruptly-flared at an angle $\theta$ within the range of 10° to 45° to a diameter $d_2$ within the range of 4 $d_1$ to 15 $d_1$ so as to form a bullet-nosed section having a longitudinal radius R equal to $$\frac{(d_2 - d_1)}{2(1 - \cos\theta)}$$

the high-discharge and low-discharge ducts being such as to have the same length e which is equal to $d_1 + R \sin \theta$ and corresponds to the minimum thickness of the plate.

Depending on the applications which are contemplated, the high-discharge and low-discharge ducts can be uniformly distributed in alternate sequence on the surface of the plate or else the periphery of the plate can be provided solely with low-discharge ducts surrounding a plurality of contiguous high-discharge ducts.

The axes of the ducts are advantageously perpendicular to the upstream surface of the plate which can be flat or alternatively curved and can thus constitute a screen unit or strainer.

BRIEF DESCRIPTION OF THE DRAWINGS

Other features of the invention will be more apparent upon consideration of the following description and accompanying drawings, wherein:

- FIG. 1 is an axial sectional view taken along line A-B of FIG. 2 and showing a "hemispherical" valve in accordance with the invention;
- FIG. 2 is a schematic part-sectional half-view taken along line II—II of FIG. 1;
- FIG. 6 is an alternative embodiment of FIG. 5;
- FIG. 7 is a schematic axial sectional view showing a distribution of ducts in a pressure reducer in accordance with the invention;
- FIG. 8 is a view which is similar to FIG. 7 and shows an alternative embodiment;
- FIG. 9 is a schematic plan view of the upstream face of the pressure reducer plate of FIG. 8;
- FIG. 10 is a schematic axial sectional view of an alternative form of low-discharge duct of a pressure reducer in accordance with the invention;
- FIG. 11 is an axial sectional view of a plate having a complex bore with combined high-discharge and low-discharge ducts, this view being taken in cross-section along line a-b of FIG. 12;
- FIG. 12 is a schematic view of the downstream face of the plate of the bore shown in FIG. 11;
- FIGS. 13 and 14 are schematic views in perspective showing multi-hole screens in accordance with the invention;
- FIG. 15 is a schematic axial sectional view of a curved pressure-reducer plate in accordance with the invention.

DESCRIPTION OF THE PREFERRED EMBODIMENTS

Figure 3:
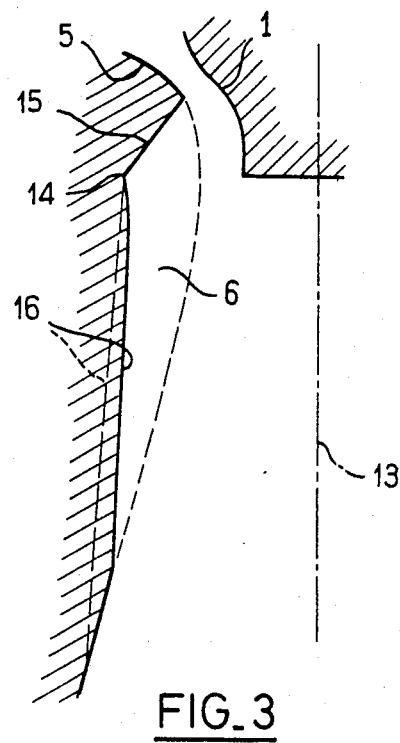
- FIG. 3 is a schematic axial sectional view of an alternative shape of recess of the valve seat of FIGS. 1 and 2.

Corresponding elements in the different figures are designated by the same reference numerals.

The valve illustrated in FIGS. 1 to 4 is designed for compressible fluid and supersonic discharge. Said valve is essentially constituted by a closure member 1, the hemispherical surface 4 of which is applied at the time of closing against the semi-toric bearing surface 20 of the valve seat 5.

The closure member 1 can be displaced axially for opening and closing the valve in the conventional manner by means which have not been shown in the drawings.

In accordance with the invention, the hemispherical axial closure member 1 has a smooth wall and is provided on the downstream side thereof with a cylindrical axial extension 2 which is joined to the hemispherical portion 4 by means of a progressively curved surface 3.

The valve seat 5 has the general shape of a conventional convergent-divergent nozzle. However, this valve seat is hollowed-out in accordance with the invention so as to form six uniformly spaced longitudinal recesses 6. The portion 7 of greatest depth of each valve-seat recess starts abruptly at a distance $\epsilon$ having the minimum value permitted by construction, from the annular and linear zone 8 of contact of the spherical portion 4 of the closure member with the semi-toric portion 20 of the valve seat in the closed position of the valve.

The portion 12 of each valve-seat recess decreases progressively in depth to a zero value in the divergent wall of the valve seat 5.

The bottom of the recess 6 is parallel to the valve axis 13 but can be divergent in the downstream direction. Thus the walls of each recess 6 form with the oppositely-facing walls 4-3 and 2 of the valve-closure member 1 a convergent-divergent nozzle 11 providing a low expansion zone, the shape of which undergoes a progressive variation with the lifting of the valve closure member between the closed position shown in chain-dotted lines in FIG. 1 and the partial-lift positions, one of which is shown in full lines in FIG. 1.

In the embodiment illustrated in FIGS. 1 and 2, each recess has the shape of a groove having a rectangular transverse cross-section. The succession of grooves forms a series of castellated notches which are cut in the periphery of the valve seat 5 below the line of closure 8.

In the alternative embodiment illustrated in FIG. 3, the bottom of the recess 6 forms a dihedron having an angle greater than 90°, the edge 14 of which is perpendicular to the valve axis 13. The upstream wall 15 of the dihedron is shorter than the downstream wall 16.

Figure 4:
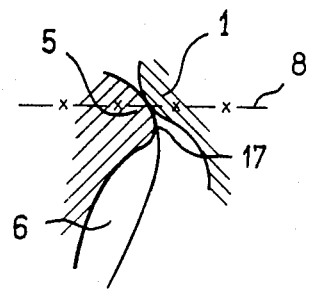
- FIG. 4 is a schematic sectional view of a detail of FIG. 1.

In the enlarged detail view of FIG. 4, in which the valve-closure member 1 is illustrated in the position of closure of the plate against the valve seat 5, it is apparent that the upstream edge of the recess 6 is rounded at 17, starting immediately in the zone of the valve-closure line 8.

In FIG. 1, a right-section recompression shock wave is designated schematically by a wavy dotted line 21. The bottom face 18 of the extension 2 of the valve-closure member as shown in this figure is provided with a hollowed-out portion 19 in order to improve the performances of the valve.

The practical advantages of this arrangement in conventional valves have been studied in particular in the article by Michel Pluviose published in "Revue Francaise de Mécanique" 1981, No 78, pages 13 to 19, and entitled : "Etude des instabilités d'écoulement dans les soupapes de réglage de turbines a vapeur" ("Study of unsteady states of flow in regulating valves of steam turbines").

In a practical example of construction of a valve of this type, the following values will be adopted:
rc/R=1.36, h/R=0.275, re/R=0.75, rq/R=0.6 and, in the case of the valve seat, R'/R=0.74, $\beta$=3.3°, P/R=1.29, R"/R=1 in which provision is made for six valve-seat recesses, the whole number nearest the $$\text{ratio} = \frac{3.1416 \times R}{1.29\,R - 0.75\,R}.$$

All these ratios are related to the radius R which corresponds to the narrowest portion of the throat of the convergent-divergent nozzle formed by the valve seat 5.

rc=radius of the hemispherical portion of the valve-closure member rq=radius of curved surface which joins the cylindrical extension 2 to the hemispherical portion 4 of the valve-closure member h=height of the closure-member extension re=radius of the cylindrical closure-member extension R'=radius of the semi-toric surface 20 of the valve seat R"=radius of upstream junction curve of bottom wall 7 of the valve-seat recess 6

P=maximum depth of valve-seat recess starting from the valve axis $\beta$=angle of the divergent section of the nozzle formed by the valve seat 5.

The width of each valve-seat recess is equal to the peripheral distance between adjacent recesses.

The radii rc, R', rq, R" can be curves of more complex shape such as, for example, curves obtained by combinations of tangent radii, or mathematical curves.

The supersonic and subsonic portions appear only in respect of given expansion ratios with a geometry which is defined by the degree of lift of the valve-closure member. In the case of different ratios, the nozzles are no longer supersonic and the internal jets separate from the side walls of the valve-seat recesses, thus facilitating backflow and achieving enhanced steady-state stability of flow.

A valve of this type is not subject to the disadvantages of conventional designs such as the valve described in U.S. Pat. No. 3,857,542 in which, in contradistinction to the present invention, the valve seat is smooth-walled whereas radial slots are cut in the wall of the valve-closure member and have the effect of deviating the flow towards the center. The invention avoids in particular any unsteady states of fluid flow within the conventional hemispherical valves, which appear even with valves which are hollowed-out at the rear end in order to prevent subsonic or supersonic recompressions by shock wave. These conventional valves are nevertheless subject to instabilities caused by the presence of supersonic or subsonic jets which disturb the operation and have the effect of shaking the structures.

These jets adhere to one wall or another in a random manner, in particular when the jets formed between the valve-closure members and the valve seat meet at the center in a layer which becomes unsteady as a result of reciprocating-motion pumping of the hollowed-out cavity.

The above-mentioned instability of conventional valves appears to arise from the mixing process which must take place between the ambient fluid and the jet. When the flow rate of the mixture fluid is too low, the flow becomes dissymmetrical and unsteady.

This phenomenon is also well-known at the time of supersonic expansions in nozzles having abruptly diverging sections.

In the valve in accordance with the invention, these disadvantages are removed in the first place by making use of a closure member having a downstream end which penetrates into the divergent section of the valve seat, thus having the effect of enhancing steady-state flow by preventing closure of the layer of jets.

Moreover, in accordance with the invention, the mixing process is improved and the phenomena of unstable jets are avoided by formation of subsonic jets interposed between the supersonic jets. This gives rise to an intense mixing process, the jets are stabilized, the interaction lengths of the jets are reduced, and noise is also attenuated.

In fact, under the action of viscosity, the fluid which flows at the highest velocity transfers part of its momentum to the fluid which flows at the lowest velocity, thus having the effect in the first place of achieving enhanced efficiency of fluid-wiredrawing through the valve.

In the second place, experiments have demonstrated the absence of rotational stream flow which would be liable to cause substantial unsteady-state negative pressures.

The invention is also applicable to safety valves which operate in a compressible fluid as well as to valves which operate in an incompressible fluid since diversification of the main jet to form jets having varied expansions also has the effect of enhancing the general steady-state stability of the fluid stream.

The multi-bore pressure reducers for compressible gases as illustrated in FIGS. 5 to 15 are each constituted by a perforated plate 101 through which ducts 105 providing a relatively low discharge and ducts 104 providing a relatively high discharge extend through said plate from one principal face 102 to the other principal face 103.

The function of said ducts is to establish a connection, with expansion but without recovery of kinetic energy, between two separate enclosures 106 and 107 at different pressures, each enclosure being located respectively on each side of the principal faces 102, 103 of the plate 101.

In the embodiment shown in FIGS. 5 to 10, the high-discharge ducts 104 are constituted by simple cylindrical bores whilst the low-discharge ducts 105 have a cylindrical entrance bore 108, the diameter of which is smaller than that of the high-discharge ducts 104. In addition, said low-discharge ducts have a downstream extension in the form of an abruptly-flared portion 109.

Figure 5:
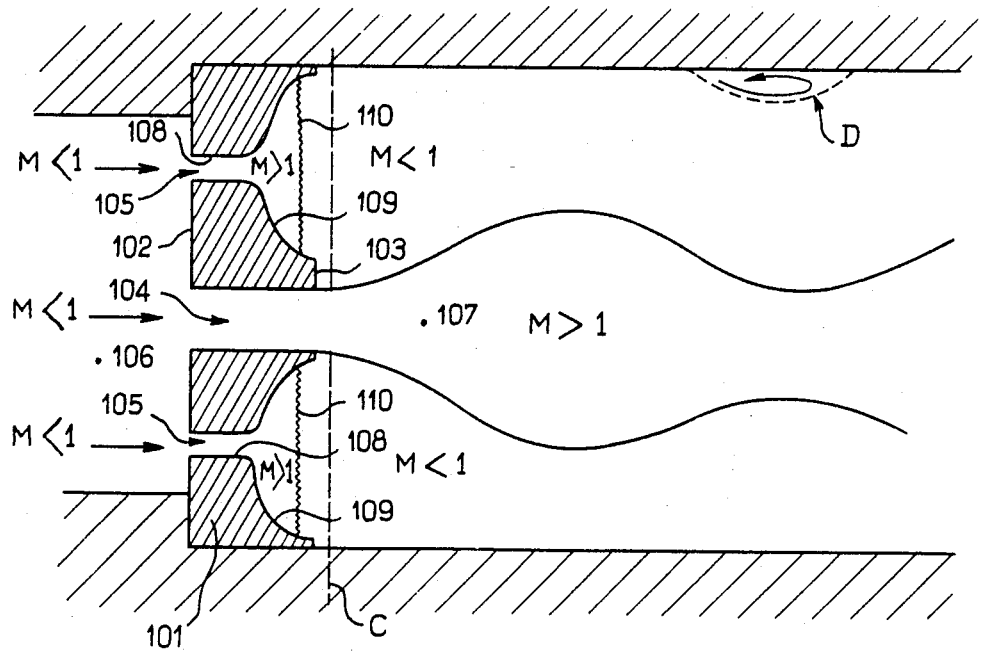
- FIG. 5 is a diagram showing the flow of fluid through a multi-bore pressure reducer in accordance with the invention.

The diagram of FIG. 5 is a schematic representation of the pattern profile of the supersonic jet which passes through the duct 104 from a high-pressure enclosure 106 into a low-pressure enclosure 107.

The supersonic jet is surrounded on each side by two subsonic jets issuing from the ducts 105. A shock wave 110 is represented schematically within the widened or flared-out sections 109. The pressure within the enclosure 107 is constant at the level of the line C.

The flow streams have a Mach number of less than 1 within the enclosure 106 and equal to 1 at the end of the cylindrical ducts 104–108. The flow streams are supersonic in the bulged downstream portion of the jet issuing from the high-discharge duct 104 as well as in the portion located upstream of the shock waves 110 within the low-discharge ducts 105 whilst the Mach number becomes lower than 1 on the downstream side of the flared sections 109 of the low-discharge ducts 105.

The pressure gradients are liable to produce localized separations or "breakaway" phenomena in the vicinity of the walls as indicated at D in FIG. 5.

These flow separations are not detrimental to the general steady-state stability of flow.

Similar phenomena are also encountered each time a supersonic discharge is adjacent to a subsonic discharge as is the case with the multi-bore plates of FIGS. 7 to 9.

In FIG. 7, the high-discharge ducts 104 are arranged alternately with the low-discharge ducts 105 whereas, in the plate of FIGS. 8 and 9, the low-discharge ducts 105 are located on the periphery of the plate in the vicinity of the walls whilst the high-discharge ducts 105 are grouped together in the central portion of the plate 101.

The embodiment of FIG. 6 is similar to that of FIG. 5 except for the fact that the divergent portion 109 of the delivery nozzle of each low-discharge duct has a bullet-nose shape 111.

In a practical example of construction, the high-discharge duct 104 has a diameter D equal to 8 mm whilst the entrance bore $d_1$ of each low-discharge duct 105 has a diameter of 2 mm. The bullet-nosed section 111 starts at an angle $\theta$ of 31.5° at the outlet of the bore 108 and has a terminal outlet diameter $d_2$ equal to 17.6 mm, the radius R of the bullet-nosed section equal to $$\frac{(d_2 - d_1)}{2(1 - \cos\theta)}$$

being 53 mm.

The multi-bore plate 101 has a minimum thickness e of 29.7 mm, equal to $d_1 + R \sin \theta$. For the sake of convenience, the value adopted for e will be 50 mm.

In the simplified embodiment of FIG. 10, two cone frustums 112–113 having apex angles $\theta$ and $\theta_1$, the angle $\theta_1$ being smaller than the angle $\theta$, form a discharge nozzle.

The various bores can be machined, formed by the spark-erosion machining process or molded so as to form divergent nozzles each providing a low-expansion zone.

The contour can be determined with a higher degree of accuracy by means of the conventional method of characteristics.

For some applications, it may prove sufficient to form simple frusto-conical flared sections and not biconical sections as shown in FIG. 10.

FIGS. 11 and 12 illustrate one form of construction of high-discharge and low-discharge ducts in which the two ducts 104 and 105 have a common inlet, and in the form of a cylindrical bore which extends right through the plate 101 from one side to the other and constitutes the high-discharge duct 104.

Four low-discharge ducts 105 are provided in the form of a longitudinal groove 115 cut in the downstream portion of the wall of the central duct 114.

FIGS. 13 and 14 illustrate two multi-bore pressure reducers in accordance with the invention. This pressure reducer is designed in the form of a cylindrical-wall screen tube 116 pierced by radial holes 104–105 which constitute respectively the high-discharge and low-discharge ducts.

In FIG. 13, the fluid arrives from the exterior and is discharged through the central duct of the screen tube whereas the reverse process takes place in the embodiment of FIG. 14.

In FIG. 15, the plate 116 has a curved surface which is directed upstream and the high-discharge and low-discharge ducts are each constituted simply by a cylindrical bore. However, the diameter of the high-discharge bores 104 is at least ten times larger than the diameter of the low-discharge bores 105.

A particular application of multi-bore plates in accordance with the invention lies in pressure reducers of electric power stations, thermal and thermonuclear power plants in which plates having a diameter of approximately 1.2 m are provided with at least 700 bores.

In the pressure reducers in accordance with the invention, part of the momentum of the fluid which flows at the highest velocity is transferred to the lowest-velocity fluid under the action of viscosity and substantial thickening of the mixing zone consequently takes place.

This results in enhanced efficiency of the pressure-reducing devices.

The orifices of the high-discharge and low-discharge ducts are all saturated. Thus no downstream disturbance is liable to move in the upward direction. There is therefore no effect of increase in the mass flow rate (by viscous entrainment) of any one jet by the adjacent jet, thus producing a highly favorable effect on the mixing process.

When the low-discharge ducts are located near the walls, there is no attendant danger of general flow separation from the walls and only closed localized separations can exist, with the result that the structures are shaken by the fluid motion only to a very slight extent. General steady-state flow of the fluid stream is ensured.

The invention can make it possible to improve existing installations equipped with multi-bore plates pierced in a conventional manner with a large number of cylindrical bores having the same diameter. It is only necessary in this case to re-machine a certain number of bores in order to form nozzles, thus permitting a mixing process between two supersonic flow streams at different velocities.

As will be readily apparent, the invention is not limited in any sense to the embodiments hereinabove described with reference to the accompanying drawings. Depending on the applications which are contemplated,, many alternative embodiments within the capacity of those versed in the art may accordingly be considered without thereby departing either from the scope or the spirit of the invention.

Thus it follows that, although it has been assumed in the foregoing description that the invention is primarily applicable to valves and multi-bore pressure reducers, the method in accordance with the invention is equally applicable in practice to the end of the labyrinth seal of a compressor bearing and to devices for the discharge of compressible and incompressible fluids.

Similarly, the invention has been mainly described from the point of view of its application to a valve having a hemispherical closure member. However, it is equally feasible to adopt closure members having a bulge which, although designated as "hemispherical" in the foregoing, is not strictly hemispherical from a geometrical standpoint but has a similar shape and operation.

What is claimed is:

1. A method for stabilizing the flow of compressible fluids in the supersonic state at the time of expansion, wherein said method comprises the formation of at least two contiguous, generally parallel flow streams consisting of the same fluid but having a different velocity distribution, one flow stream being maintained unchanged in the supersonic state and another supersonic flow stream being modified by conversion to the subsonic state, and thereafter mixing of the two flow streams for degradation of kinetic energy.

2. A method according to claim 1, wherein a primary stream of fluid under pressure is split up into a plurality of secondary streams, wherein some of said secondary streams are modified by conversion to the subsonic regime and wherein the modified streams and unchanged streams are allowed to mix in a medium having a lower pressure than said primary stream.

3. A method according to claim 2, wherein the fluid ids discharged in the vicinity of at least one wall which is isolated from the unchanged flow stream by means of at least one modified flow stream which is parallel to said wall.

4. A method according to claim 2, wherein the fluid discharge is caused to take place at a distance from the side walls and front walls.

5. A method according to claim 3, wherein the fluid discharge is guided between two walls so shaped as to form between them a series of nozzles having different flow characteristics.

6. The method according to claim 5, wherein the shape fluid-discharge walls have opposite surfaces which are divergent in the downstream direction.

7. A method for stabilizing the flow of compressible fluids in the supersonic state through a pressure drop zone which comprises passing said fluid through a valve having orifice means, said orifice means defining a large diameter portion for supersonic flow of said fluid and a relatively small diameter portion for subsonic flow of said fluid to direct differing amounts of fluid through respectively said large and small diameter protions in generally initially parallel relation to each other, said relatively small diameter portion comprising a directly downstream portion defining outwardly flaring wall means to cause the fluid stream or streams through said relatively narrow diameter portion to reduce velocity to subsonic, whereas the velocity of the fluids stream or streams passing through the large diameter portion remains supersonic, whereby the large diameter and small diameter stream or streams mix and degrade in kinetic energy with less violent turbulance.

8. The method of claim 7 in which said large diameter portion and small diameter portion each comprise a plurality of ports of respectively relatively large diameter and relatively small diameter.

9. The method of claim 8 in which said small diameter ports surround said large diameter ports which are clustered together in a group.

10. The method of claim 8 in which the flow through the large diameter ports is maintained unchanged in the supersonic regime, while flow through the small diameter ports is modified by conversion to the subsonic regime.

11. The method of claim 8 in which said ports are defined in partition means, said large diameter and small diameter ports communicating through said partition means with a high pressure area of fluid on one side thereof and a low pressure area of fluid on the other side thereof, whereby streams through said large diameter and small diameter ports are allowed to mix in said lower pressure area.

* * * * *